No. 737,391. PATENTED AUG. 25, 1903.
C. L. GOEHRING & W. TROCHE.
GLASS BEVELING MACHINE.
APPLICATION FILED JUNE 7, 1902.
NO MODEL. 6 SHEETS—SHEET 1.

Witnesses:
J. M. Fowler Jr.
Thomas Durant

Inventors
Charles L. Goehring and
William Troche
by Church & Church
their Attys.

No. 737,391. PATENTED AUG. 25, 1903.
C. L. GOEHRING & W. TROCHE.
GLASS BEVELING MACHINE.
APPLICATION FILED JUNE 7, 1902.
NO MODEL. 6 SHEETS—SHEET 2.

No. 737,391. PATENTED AUG. 25, 1903.
C. L. GOEHRING & W. TROCHE.
GLASS BEVELING MACHINE.
APPLICATION FILED JUNE 7, 1902.
NO MODEL. 6 SHEETS—SHEET 4.

No. 737,391. PATENTED AUG. 25, 1903.
C. L. GOEHRING & W. TROCHE.
GLASS BEVELING MACHINE.
APPLICATION FILED JUNE 7, 1902.
NO MODEL. 6 SHEETS—SHEET 5.
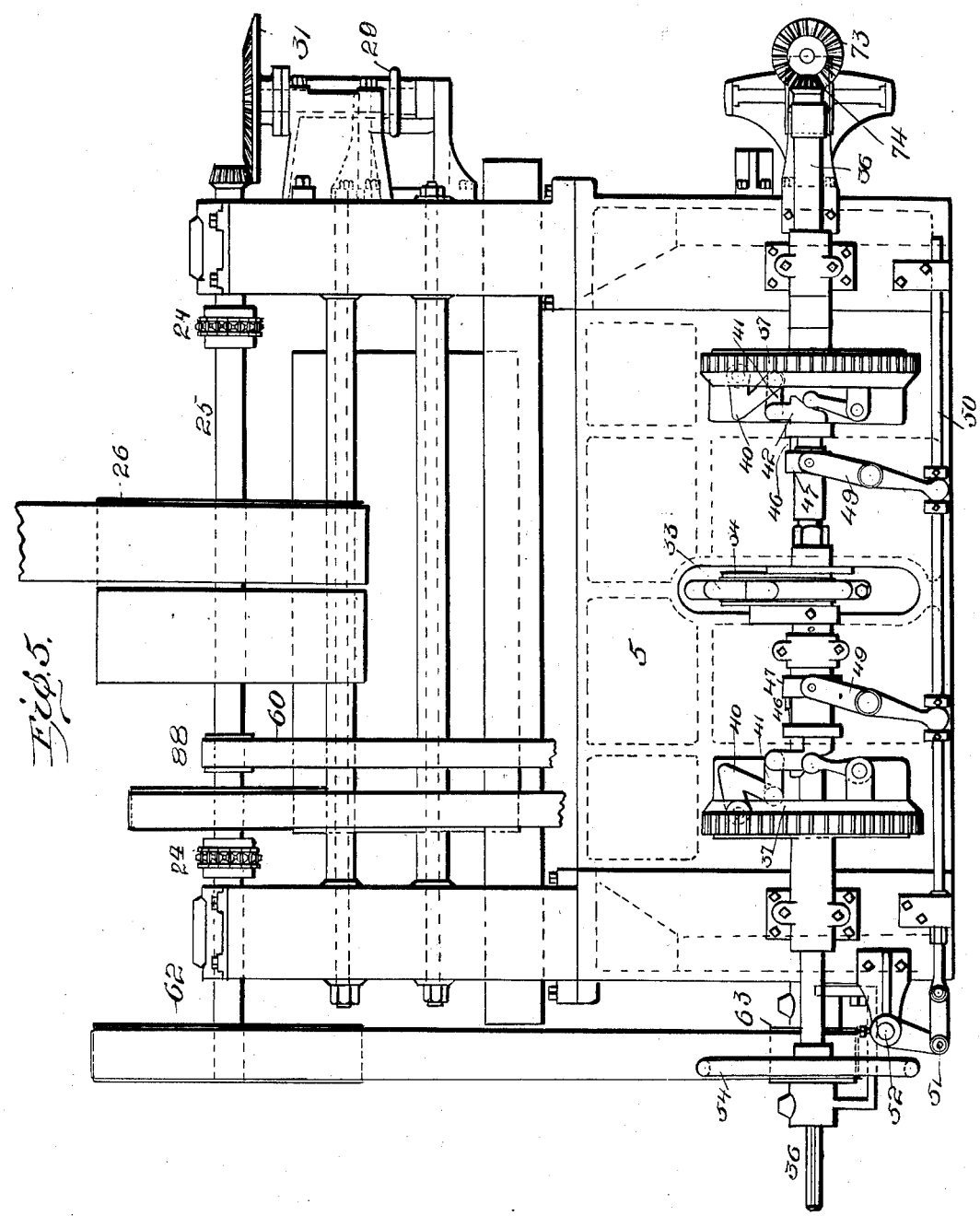

No. 737,391. PATENTED AUG. 25, 1903.
C. L. GOEHRING & W. TROCHE.
GLASS BEVELING MACHINE.
APPLICATION FILED JUNE 7, 1902.
NO MODEL. 6 SHEETS—SHEET 6.
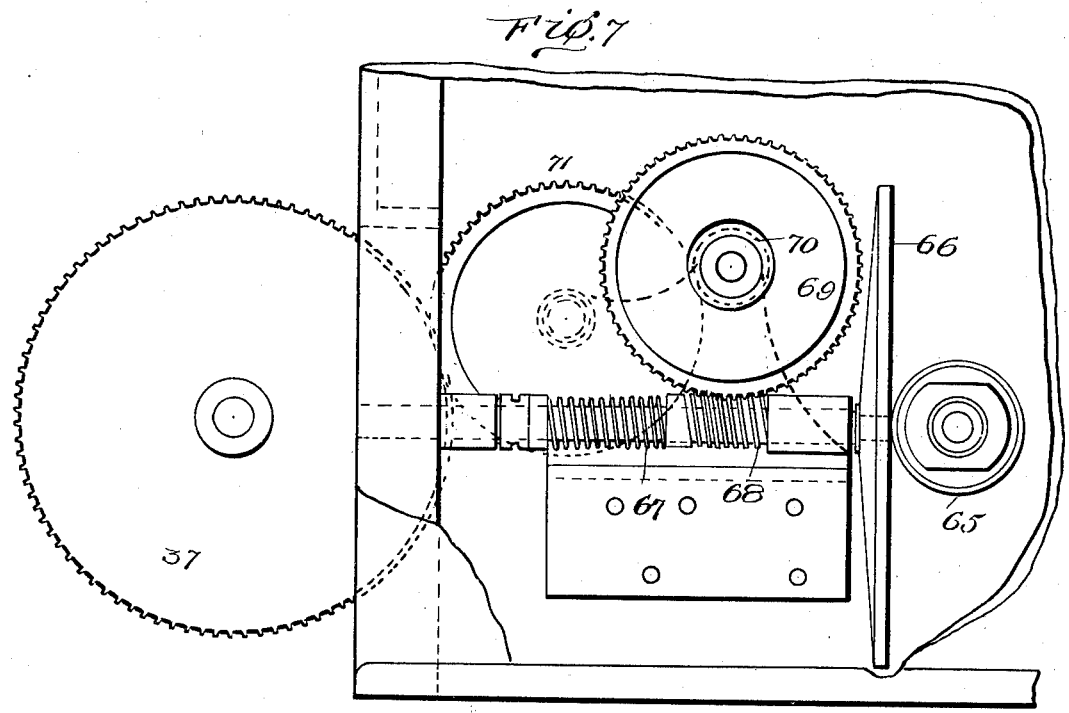
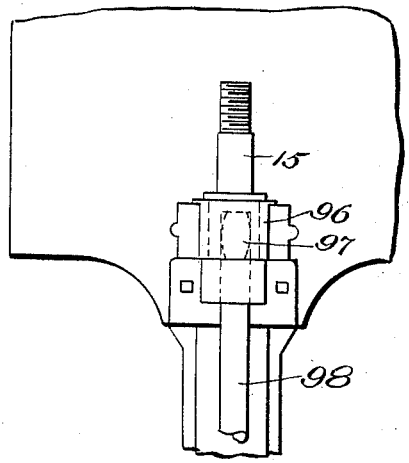
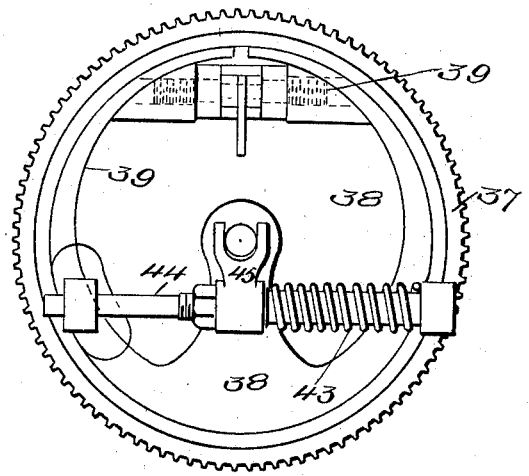

No. 737,391. [Patented August 25, 1903.

UNITED STATES PATENT OFFICE.

CHARLES L. GOEHRING AND WILLIAM TROCHE, OF AKRON, OHIO; SAID TROCHE ASSIGNOR TO SAID GOEHRING.

GLASS-BEVELING MACHINE.

SPECIFICATION forming part of Letters Patent No. 737,391, dated August 25, 1903.

Application filed June 7, 1902. Serial No. 110,661. (No model.)

*To all whom it may concern:*

Be it known that we, CHARLES L. GOEHRING and WILLIAM TROCHE, both citizens of the United States, residing at Akron, in the county of Summit, State of Ohio, have invented certain new and useful Improvements in Glass-Beveling Machines; and we do hereby declare the following to be a full, clear, and exact description of the same, reference being had to the accompanying drawings, forming a part of the same, and to the figures of reference marked thereon.

The present invention relates to the art of glass-grinding, features of the invention being applicable generally to this art, although the invention is more especially applicable to the beveling of the edge or edges of glass plates and with the objects in view of enabling the work to be performed expeditiously and by mechanical means with the employment of a minimum of skilled labor.

A further object of the invention is to provide a means whereby a flat as distinguished from a concave bevel may be produced.

The invention consists in providing a means whereby the glass is held with its edge parallel with the axis of the grinder and at the same time moved in the plane or parallel with the plane of the bevel, thereby forming a flat bevel.

The invention further consists in mounting the glass-support on ways to move toward and from the grinder in a plane at an angle to the plane of the support and glass thereon, and, further, in certain novel details of construction and combinations and arrangements of parts, all as will be now described, and pointed out particularly in the appended claims.

Figure 1:
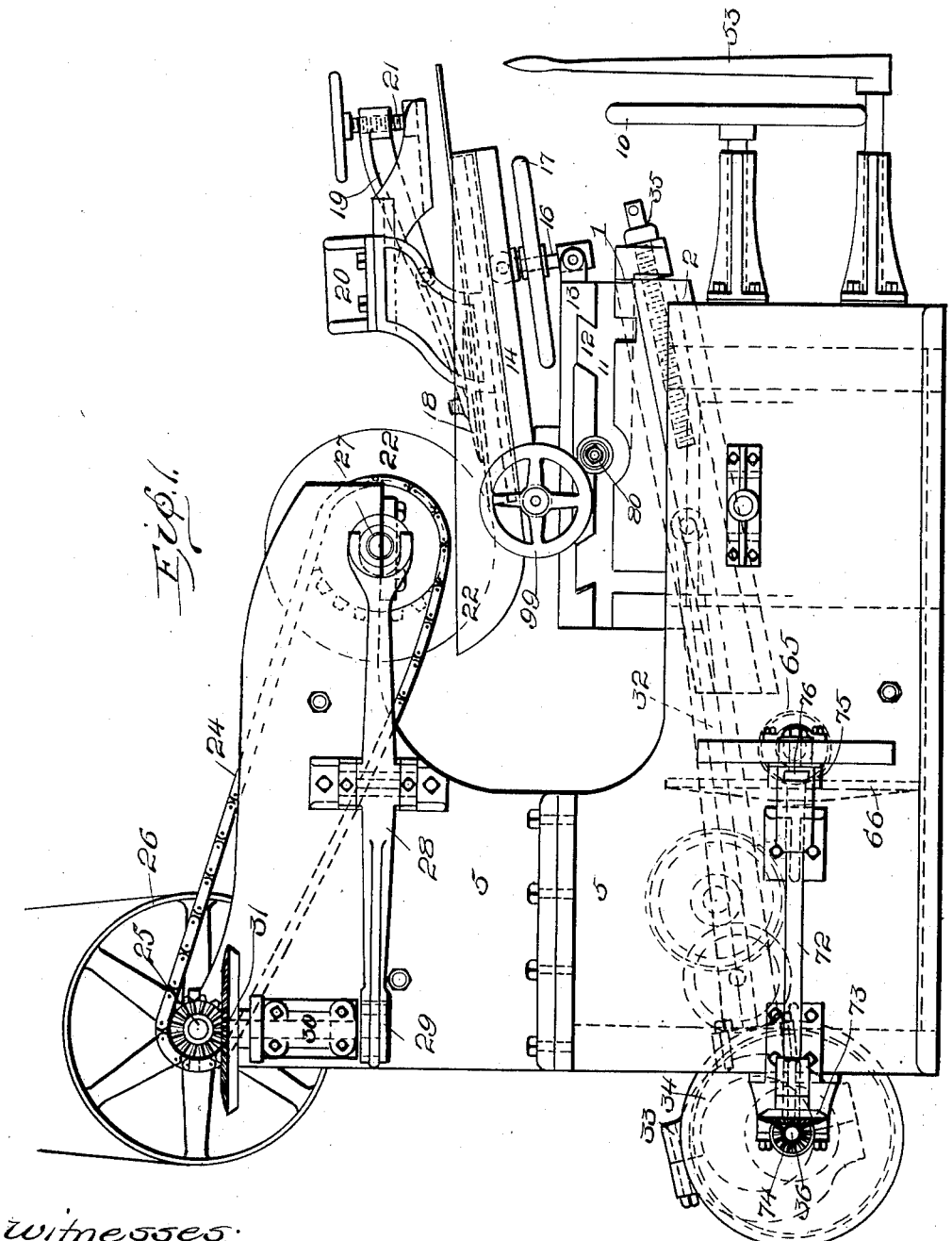
Figure 2:
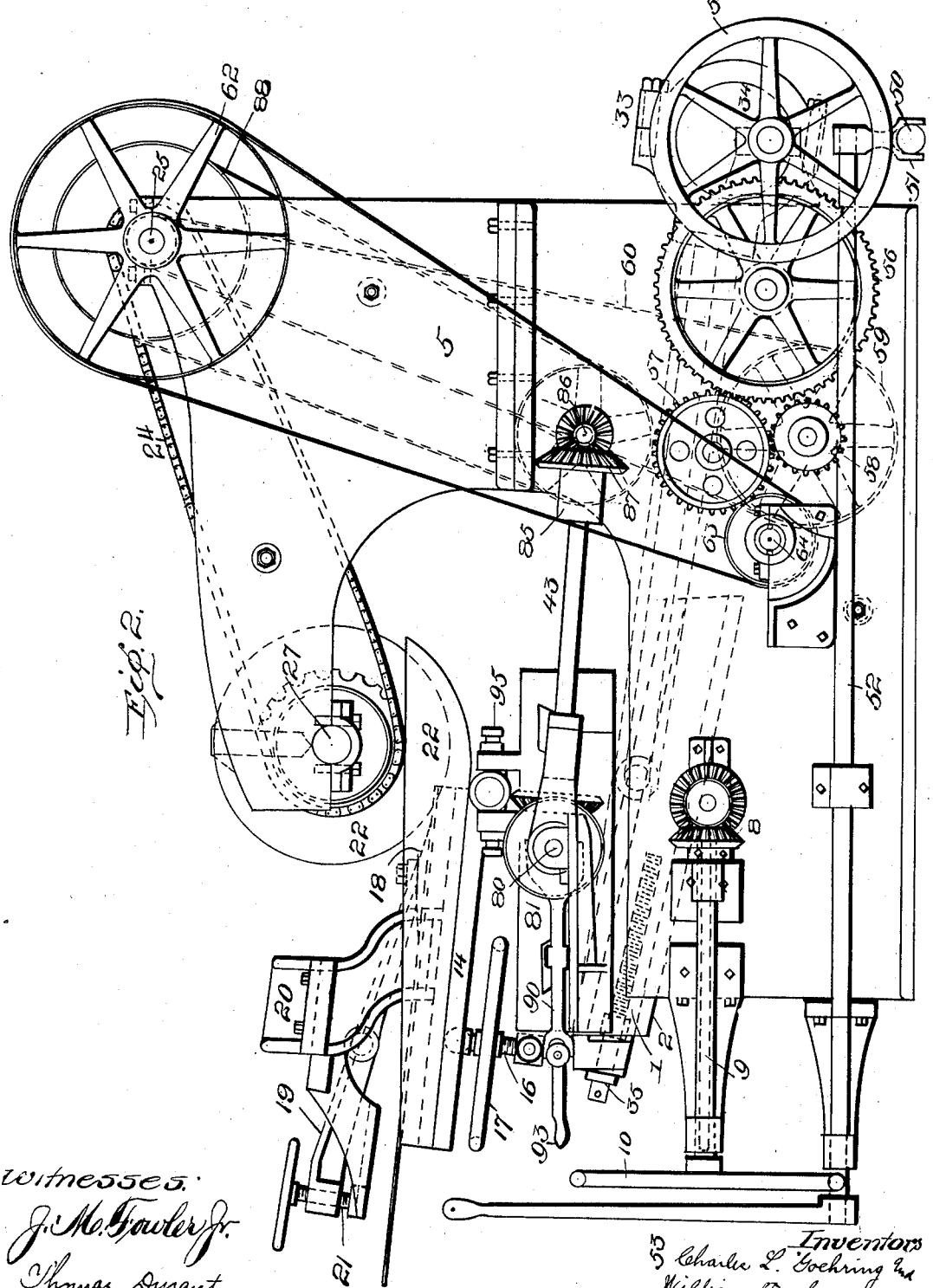
Figure 3:
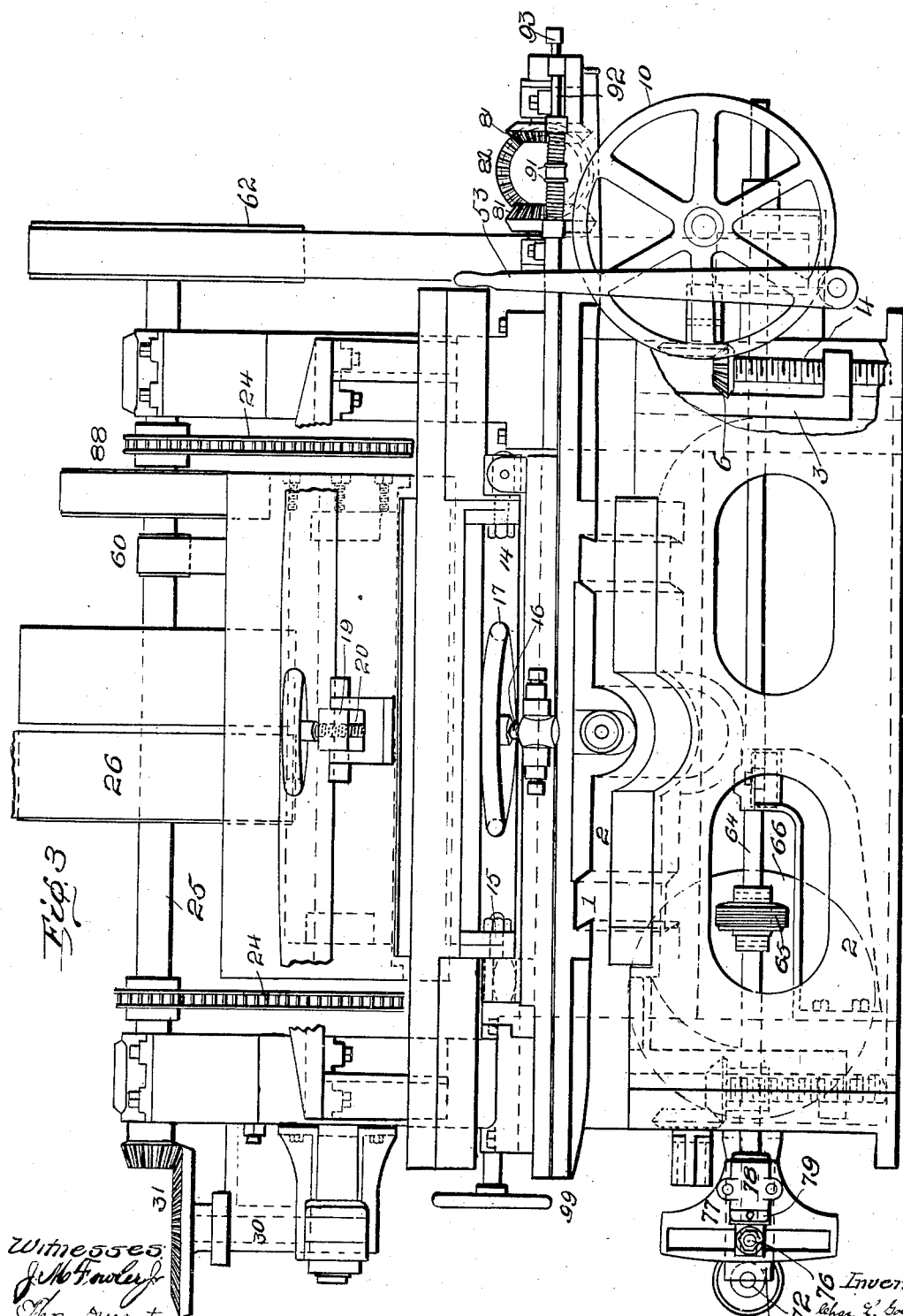
Figure 4:
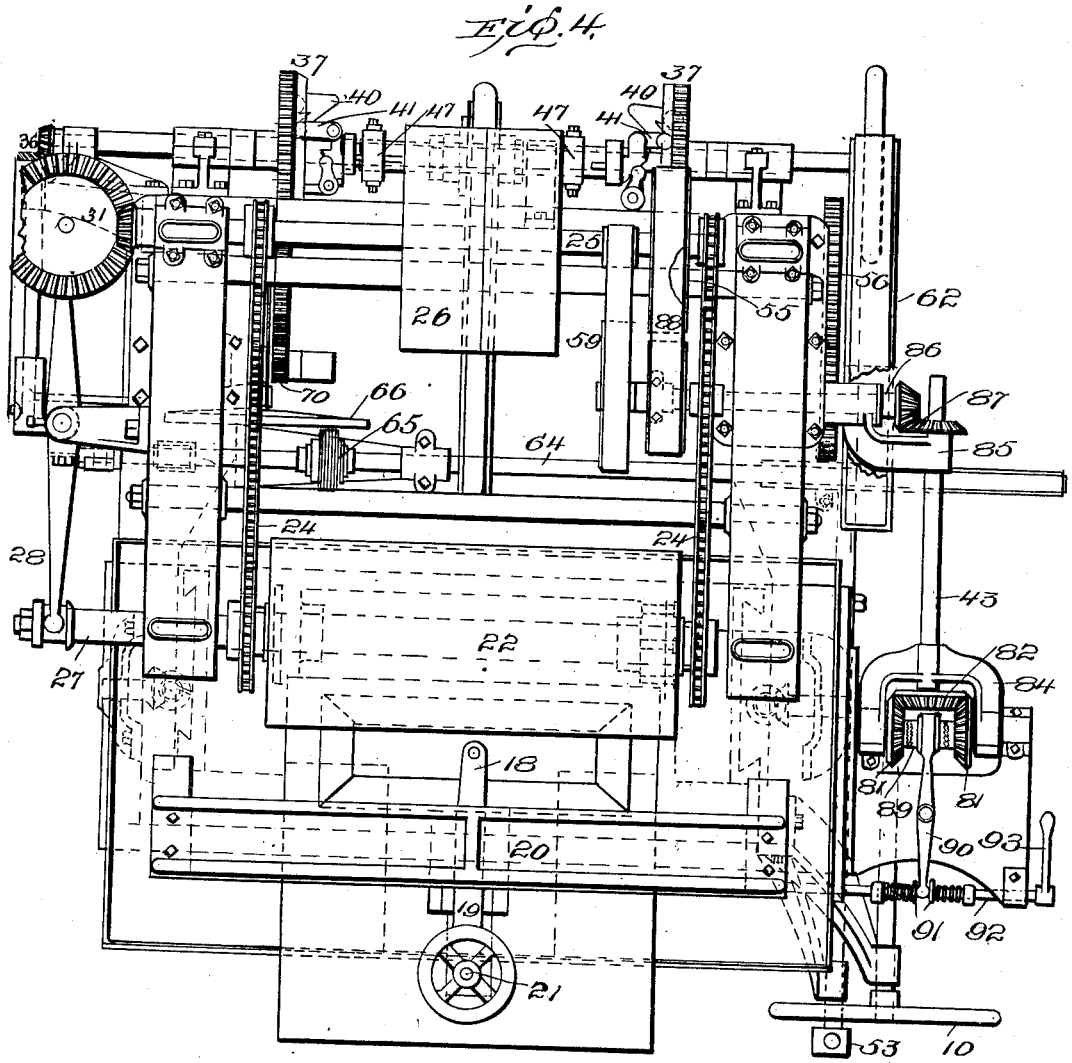

In the accompanying drawings, Figure 1 is an elevation looking at the left side of a beveling-machine in which the work is moved on inclined ways past the grinder. Fig. 2 is a similar view looking at the opposite side of the machine. Fig. 3 is a front elevation, a portion of the frame being broken away to show underlying parts. Fig. 4 is a top plan view. Fig. 5 is a rear elevation showing the clutch-shaft and clutches with their operating mechanism. Fig. 6 is an elevation of one of the clutches. Fig. 7 is an elevation of the differential gear. Fig. 8 is a detail of the mechanism for adjusting the plane of the work-holder transversely.

Similar numerals of reference in the several figures indicate the same parts.

In the machine illustrated the work is mounted on a support adapted to reciprocate on inclined ways 1, formed on or as part of a vertically-adjustable table 2, said table having depending legs or vertically-guided standards 3, provided with offsets having threaded openings for the reception of adjusting-screws 4. The screws 4 are journaled in the main frame 5 of the machine and are conveniently rotated by miter-gears 6 and a transverse shaft 7, the latter having at one end miter-gears 8, connecting it and a forwardly-extending shaft 9, provided with a hand-wheel 10 or other convenient means whereby it may be rotated to raise or lower the table.

The work-support consists of a primary carriage 11, mounted to slide on the ways 1 and itself having transversely-extending ways 12, on which a secondary carriage 13 is mounted for movement longitudinally of the axis of the grinder. The direct support for the work-holder is a work-support 14, pivotally mounted at one end on the secondary carriage 13 by pivots 14 15, the latter of which is adjustable for the purpose of leveling up the work-holder or changing its transverse inclination should a tapering bevel be formed or the glass be of unequal thickness.

The forward end of the pivoted work-holder is adjusted by a screw 16, controlled by a hand-wheel 17, whereby the inclination of the work-holder may be conveniently set to give any desired width or inclination of bevel. The work or glass plate is clamped down on its support by a clamp-plate 18, controlled by a lever 19, pivoted on a bridge 20 and held by a screw 21, bearing on an extension of the bridge, as shown clearly in Fig. 1.

Located on or forming a part of the work-holder is a water-pan 22, the walls of which are of sufficient height to permit of water being held therein to a level above the grinding-point. The water-pan may conform to the inclination of the support and its upper edge be cut off substantially horizontally. Thus the glass plate may project over the edge of the pan and relatively large plates be handled with a comparatively narrow pan. This construction furthermore provides a deep recess for the grinder at the lower end of the support, into which the grinder passes after leaving the glass. Journaled in bearings in an overhang or arm of the main frame 5 is the grinder 22, usually a cylinder of abrading material, preferably having a length equal to or greater than the length of the bevel to be formed and so mounted in its bearings that it may be given a longitudinal as well as a rotary movement. For rotating the grinder sprocket-wheels 23 are mounted on its shaft, and chains 24 connect said wheels and similar wheels on the main drive-shaft 25, receiving its motion from any suitable source of power, as by belt and fast and loose pulleys 26.

For giving a movement to the grinder longitudinally of its axis its shaft is journaled loosely in its bearings, and a grooved collar 27 at one end receives the forked end of a lever 28, pivoted to the frame and receiving its motion from a crank-pin 29 on a vertical shaft journaled in a box 30 on the frame and driven by a pair of miter-gears 31, connecting said shaft and the drive-shaft 25. The gear on the vertical shaft is preferably large to give the grinder a relatively slow reciprocation longitudinally of its axis.

The carriage 11 is adapted to be reciprocated on the ways 1 through the medium of a connecting-rod 32, pivotally and adjustably connected with the carriage at the front end and at the rear end connected with an eccentric-strap 33, surrounding an eccentric 34 on the secondary drive-shaft 36, adapted to be driven in one direction or the other through mechanism to be presently described. A screw 35 is provided in the connection between the carriage 2 and the connecting-rod for permitting of the manual adjustment of the carriage on the table to initially position the glass, the end of said screw extending out into convenient position for the application of a wrench or handle.

The secondary drive-shaft for reciprocating the carriage and work transversely of the axis of the grinder is rotated in one direction or the other through clutches, preferably of the friction type and each embodying a gear-wheel 37, loosely journaled on the shaft 36, an expansible clutch-section 38, keyed to the shaft and rotating in unison therewith. The expansible section is expanded to tighten the clutch by a right and left screw 39, Fig. 6, operated by a bell-crank lever 40, Fig. 5, connected by a link 41 with a collar 42, loose on the shaft 36. The collar 42 is moved outwardly to release the clutch by a spring 43, Fig. 6, preferably surrounding a rock-shaft 44, journaled on the expansible section and having a forked arm 45, embracing and working against suitable shoulders on the collar. To move the collar in the opposite direction and tighten the clutch, the collar is provided with a pin 46, Fig. 5, adapted to bear against a sleeve 47 on the shaft 36, which sleeve is moved manually and is provided with a hole or recess at a suitable point, as indicated by the dotted lines at 48, into which the pin may drop at a predetermined point in the rotation of the shaft to thereby release the clutch and permit the shaft to come to rest. The clutches are reversely arranged on the shaft, and the sleeves 47 are operated by levers 49, pivoted on the frame and both coöperating with a slide or operating rod 50. The latter rod is connected by a link and arm 51 with a rock-shaft 52, extending out to the front of the machine, and provided with a handle or lever 53, whereby one clutch may be thrown into action by a movement of the lever in one direction and the other clutch by a movement of the lever in the opposite direction, while if the lever be left in an intermediate position both clutches are loose, and the shaft 36 may be set at any angle of start desired. For setting the shaft at the desired angle of start it is conveniently provided at one end with a hand-wheel 54.

The mechanism for driving the clutches preferably comprises two independent systems of gearing, one, that for driving the reversing-clutch, being a simple system of spur-gearing comprising gear-wheels 55, 56, 57, and 58, the latter driven by a pulley 59, connected by belt 60 with a pulley 61 on the main drive-shaft 25. Driving-gear for the "ahead" clutch embraces a differential or fast and slow gearing, whereby the speed of feeding may be varied during a cut—that is to say, the feed may be fast when the cut is rough or the body of the glass to be removed is small and slow where greater delicacy is required. This differential drive-gearing comprehends a pulley 62 on the shaft 25, belted to a small pulley 63 on a longitudinally-movable shaft 64, journaled in the frame near the bottom of the machine and carrying a friction-wheel 65. Friction-wheel 65 bears against the face of a friction-disk 66, Fig. 7, held advanced by a spring 67 and adapted to drive a worm 68, meshing with a worm-wheel 69. The worm-wheel 69 drives a spur-gear 70, Fig. 4, meshing with a gear 71, and the latter in turn meshes with the gear on the clutch. Obviously now longitudinal movement of the shaft 64 will cause the wheel 65 to travel across the face of the disk 66, and the speed of the latter will be thereby determined. For moving the shaft 64 longitudinally and to a regulated extent a connection is established with the secondary drive-shaft, such connection embracing an intermediate shaft 72, having at its rear end a miter-gear 73, meshing with a corresponding gear 74 on the shaft 36, and at its forward end a slotted crank 75, in which is adjustably mounted a crank-pin 76. The crank-pin 76 works in a slotted cross-head 77, adjustably connected with the end of the shaft 64, such adjustable connection being preferably formed by a bearing 78 on the cross-head, in which the shaft may turn, and adjustable collars 79 on the shaft for positioning the bearing longitudinally of the shaft. Provision is also made in this machine for when desired effecting a transverse reciprocation of the work-holder without interrupting or interfering with the previously-described movements, this reciprocation of the carriage being parallel with the axis of the grinder. To effect this transverse feed of the work-holder, there is interposed between the carriage 11 and secondary carriage 13 a feed-screw 80 for moving the secondary carriage on the ways 12. This feed-screw carries reversely-disposed bevel-gears 81 at one end, loosely journaled thereon and meshing with a drive-gear 82 on the forward end of a shaft 83. Shaft 83 at its forward end is journaled in a bearing 84, pivoted on the screw-shaft, and at its rear end it is journaled and free to slide longitudinally in a bearing 85, mounted to swing on a shaft 86. Shafts 86 and 83 are geared together by miter-gears 87, the shaft 83 being keyed to its gear, but free to slide longitudinally therethrough to compensate for the various adjustments and movements of the table and carriage. Shaft 86 receives its motion from the main drive-shaft through the belt and pulleys 88.

Between the gears 81 and keyed to the screw-shaft is a sliding clutch-collar 89, adapted to connect one or the other of the gears with the screw and so rotate said screw to drive the carriage in the desired direction. The clutch-collar is controlled by a lever 90, pivoted on the frame, and at its opposite end held between spring-pressed stops 91 on a control-rod 92, journaled on the carriage 11, so as to be capable of rotary or longitudinal movements. At one end the control-rod is provided with a handle 93, whereby it may be manipulated, and in addition it is provided with two sets of adjustable projections 94, either set of which may be turned into position to be struck by the secondary carriage or a projection thereon to shift the clutch-collar and reverse the direction of motion of the carriage. By providing two sets of projections one set may be adjusted for reversing when grinding the short and the other set for reversing when grinding the longer edges of a plate. If neither set is in position to be struck, the clutch-collar may be set in an intermediate position, when no motion will be imparted to the feed-screw.

In adjusting the work on its holder it may be found that the glass is thicker at one side than at the other or the work holder or carriage may be slightly out of alinement and in order to form a true bevel the work must be brought into true parallelism with the axis of the grinder. Adjustment for this purpose is secured by making the pivot 14 capable of a pivotal action at right angles to the axis of the work-holder, as by mounting it between supporting-screws 95, Fig. 2, while the opposite pivot 15 is carried by a stud-box 96, having a cup for the reception of the spherically-formed eccentric end 97 of a shaft 98, supported in bearings on the secondary carriage and provided at its end with a hand-wheel 99, whereby by a rotation of the hand-wheel the pivot for one side of the glass-support can be adjusted vertically.

In operation the width of the bevel is controlled by the inclination of the work-holder on the pivots 14 15, as determined by the adjustment of the hand-wheel 17, and the depth of the cut is controlled by the vertical adjustment of the table, as determined by the hand-wheel 10. The feed of the work to the grinder during the grinding operation is effected through the differential driving-gear controlled by its clutch and the lever 53, while the reverse feed may be more rapid and is effected through the spur drive-gear controlled by its clutch and the same hand-lever 53.

In the operation of the clutches the holes for the pins 46 are preferably spaced a half-turn apart, whereby the shaft will be given a half-revolution in each direction, and it will be understood that when a clutch is released by its pin entering its hole the shaft 36 is arrested and will be held until the pin is withdrawn and the reverse movement will not be communicated to it until the lever 53 is shifted over far enough to force the other pin into engagement and so tighten the other clutch. The mechanism thus constitutes a self-acting stop or trip and prevents the overrunning of the shaft in either direction or the accidental continued reciprocation of the carriage in case the attendant is not paying attention.

Having thus described our invention, what we claim as new, and desire to secure by Letters Patent, is—

1. In a glass-beveling machine, the combination with the rotary grinder and driving mechanism therefor, of a glass-support, ways on which said support travels extending in a plane at an angle to the plane of said support and mechanism for moving said support on the ways without changing the angle of the plane of the support with respect to the grinder whereby a feed movement in the plane of the bevel is effected.

2. In a glass-beveling machine, the combination with the rotary grinder and driving mechanism therefor, of an angularly-adjustable glass-support, ways on which said support travels toward and from the grinder extending at an angle to the support and mechanism for moving said support on its ways without changing the angle of the plane of the support with respect to the grinder whereby a feed movement in the plane of the bevel is effected.

3. In a glass-beveling machine the combination with the rotary grinder and driving mechanism therefor, of an adjustable table, ways thereon extending in a plane inclined with respect to the plane of movement of the table, a glass-support mounted on said ways and a feeding mechanism for moving the support on the ways without changing the angle of the plane of the support with respect to the grinder to form a flat as distinguished from a concave bevel; substantially as described.

4. In a glass-beveling machine, the combination with a rotary grinder, of a vertically-adjustable table having inclined ways thereon, a reciprocatory carriage on said ways, an angularly-adjustable glass-support on the carriage, driving mechanism for reciprocating the carriage and adjusting mechanism for adjusting the angular position of the support on the carriage whereby the angle at which the glass is presented to the grinder may be varied; substantially as described.

5. In a glass-beveling machine, the combination with the grinder, of the vertically-adjustable table having inclined ways thereon, a reciprocatory carriage on said ways and itself having transversely-extending ways, a secondary carriage on the latter ways, a glass-support on the secondary carriage and driving mechanism for simultaneously reciprocating said carriage and secondary carriage; as set forth.

6. In a glass-beveling machine, the combination with the grinder, of the vertically-adjustable table having inclined ways thereon, a reciprocatory carriage on said ways and itself having transversely-extending ways, a secondary carriage on the latter ways, a pivoted glass-support on the secondary carriage, an adjusting mechanism for determining the angular position of the support and driving mechanism for simultaneously reciprocating the carriage and secondary carriage; substantially as set forth.

7. In a glass-beveling machine, the combination with the grinder, of the glass-support, pivots for said support, adjusting mechanism for determining the angle of the support, a carriage having horizontal ways extending parallel with the axis of the grinder and on which the support is mounted, inclined ways extending toward and from the grinder and on which the carriage is mounted and driving mechanism for simultaneously reciprocating said support on both of said ways; substantially as described.

8. In a glass-grinding apparatus, the combination with a rotary cylindrical grinder adapted for grinding the whole length of the bevel at one operation, of a glass-support mounted on an axis parallel with the axis of the grinder and means for moving said support on its pivots to vary the angle of presentation of the glass to the periphery of the grinder; substantially as described.

9. In a glass-grinding apparatus, the combination with a rotary cylindrical grinder having a length not less than the length of the bevel to be ground, of a glass-support pivotally supported on an axis parallel with the axis of the grinder, a carriage for the support and ways extending toward and from the grinder and on which said carriage is mounted; substantially as described.

10. In a glass-grinding apparatus, the combination with a rotary cylindrical grinder, of a glass-support pivotally supported on an axis parallel with the axis of the grinder, a carriage for the support and vertically-adjustable inclined ways on which the support is mounted to travel toward and from the grinder; substantially as described.

11. In a glass-grinding apparatus, the combination with a rotary cylindrical grinder, of a glass-support, pivots on which said support is mounted and adjusting mechanism for varying the angle of the axis of said pivots with relation to the axis of the grinder whereby the surface of the glass may be brought into parallelism with the axis of the grinder; substantially as described.

12. In a glass-grinding apparatus, the combination with the rotary grinder and a work-support mounted on ways to move toward and from the grinder of a differential driving-gear for moving said support on the ways toward the grinder and a direct non-differential driving-gear for moving said support in the reverse direction; substantially as described.

13. In a glass-grinding apparatus, the combination with the rotary grinder and a work-support mounted on ways to move toward and from the grinder in the plane of the bevel, independent driving-gear for moving the support in each direction, manually-controlled mechanism for both of said gears and independent stops for arresting said gears at predetermined points in the movements of the support; substantially as described.

14. In a glass-grinding apparatus, the combination with the rotary grinder and a work-support mounted on ways to move toward and from the grinder, of a differential driving-gear for advancing the support a non-differential driving-gear for moving the same in the reverse direction, independently-acting stops for arresting the said driving mechanisms at predetermined points in the travel of the support and manually-controlled mechanism controlling the inauguration of the movement of the driving-gear; substantially as described.

15. In a glass-grinding apparatus, the combination with the grinder and work-support movable toward and from the grinder, a drive-shaft, independent clutches on said driving-shaft, independent trains of gearing for driving said clutches and shaft when coupled therewith whereby the shaft may be operated at different speeds, a manually-operated controlling mechanism for effecting the engagement of said clutches and automatically-operating tripping mechanism for disconnecting said clutches, the manually-operated controlling mechanism embodying a lever adapted to be moved in one direction to effect the engagement of one clutch and in the opposite direction to effect the engagement of the other clutch; substantially as described.

16. In a glass-beveling apparatus, a rotary grinder, a work-support and a tank in which the work carried by the support is immersed at the grinding-point both mounted on a pivotal center parallel with the axis of the grinder; substantially as described.

17. In a glass-beveling machine, a rotary grinder and a work-support mounted on a pivotal center parallel with the axis of the grinder, of a tank surrounding the support at the grinding-point and having its side walls extending above the level of the portion of the work being ground; substantially as described.

18. In a glass-beveling machine, the combination with the rotary grinder and work-support mounted to reciprocate with respect to each other in an inclined plane, of a tank surrounding the work-support and having its end into which the grinder passes when in its relatively lowest position deeper than the opposite end; substantially as described.

19. In a glass-beveling machine, the combination with the rotary grinder and inclined work-support mounted to reciprocate with respect to each other in an inclined plane, of a tank surrounding the lower portion of the work-support and having its side walls of greatest height at the lower end of the work-support.

CHARLES L. GOEHRING.
WILLIAM TROCHE.

Witnesses:
P. FANNY FALOR,
H. S. FALOR.